United States Patent
Pigott et al.

(10) Patent No.: US 10,289,461 B2
(45) Date of Patent: May 14, 2019

(54) PROTECTED DATA TRANSFER

(71) Applicant: McLaren Applied Technologies Limited, Woking, Surrey (GB)

(72) Inventors: Robert Thomas Pigott, Guildford (GB); Charles Edward Hawkins, Woking (GB); Gregg Dinning, Farnham (GB)

(73) Assignee: McLaren Applied Technologies Limited, Woking (GB)

( * ) Notice: Subject to any disclaimer, the term of this patent is extended or adjusted under 35 U.S.C. 154(b) by 550 days.

(21) Appl. No.: 15/047,403

(22) Filed: Feb. 18, 2016

(65) Prior Publication Data
US 2016/0246859 A1    Aug. 25, 2016

(30) Foreign Application Priority Data

Feb. 19, 2015 (GB) .................................. 1502761.8

(51) Int. Cl.
*G06F 9/54* (2006.01)
*G06F 21/62* (2013.01)

(52) U.S. Cl.
CPC .......... *G06F 9/544* (2013.01); *G06F 21/6281* (2013.01)

(58) Field of Classification Search
CPC ........ G06F 8/433; G06F 9/466; G06F 21/554; G06F 21/6272
See application file for complete search history.

(56) References Cited

U.S. PATENT DOCUMENTS

| 4,937,737 | A | 6/1990 | Schwane et al. |
| 5,056,003 | A | 10/1991 | Hammer et al. |
| 5,218,713 | A | 6/1993 | Hammer et al. |
| 8,271,996 | B1 * | 9/2012 | Gould ..................... G06F 9/542 719/312 |

(Continued)

OTHER PUBLICATIONS

Intellectual Propery Office, Search Report for Application No. GB1502761.8, dated Aug. 5, 2015, 4 pages, U.K.

*Primary Examiner* — Yuk Ting Choi
(74) *Attorney, Agent, or Firm* — Alston & Bird LLP

(57) ABSTRACT

A data management controller for a data processing system, the data processing system being capable of running one or more user space applications, each user space application defining: (i) one or more interface storage locations with which the data management controller can interact, each interface storage location being capable of storing interface data; and (ii) one or more services for processing data, each service interacting with at least one interface storage location during a processing run; the data management controller being configured to: (i) register each of the interface storage locations as an input data location or an output data location in response to the user space application so identifying the respective interface storage location to the data management controller; (ii) register the output data locations of user space applications as designated inputs to input data locations of one or more other user space applications; and (iii) in response to a user space application signalling that a processing run of a service is complete, initiate copying of the interface data stored in the output data locations with which that user space application interacts to the input data locations to which those output data locations are the designated inputs.

28 Claims, 2 Drawing Sheets

(56) References Cited

U.S. PATENT DOCUMENTS

| 8,286,188 B1 | 10/2012 | Brief | |
|---|---|---|---|
| 2007/0220009 A1* | 9/2007 | Morris | G06F 21/6218 707/999.01 |
| 2013/0007849 A1* | 1/2013 | Coulter | G06F 21/10 726/4 |

* cited by examiner

PROTECTED DATA TRANSFER

CROSS-REFERENCE TO RELATED APPLICATIONS

This application claims priority to and the benefit of United Kingdom Application No. 1502761.8, filed Feb. 19, 2015, the contents of which as are hereby incorporated by reference in their entirety.

BACKGROUND

Technical Field

This invention relates to controllers for a data processing system and in particular it relates to data management controllers and data transport controllers for a data processing system.

Related Field

A data processing system may run one or more applications. Each of these applications may be a producer of data and/or a consumer of data. The applications that consume data may also process the data they consume and thus also be producers of data. The consumers may process data that has been produced by at least one of the applications that produces data. There is therefore a requirement in such data processing systems to deliver data between each of these producers and consumers.

In environments such as a control system environment and/or other regulated processing environments, such as in financial institutions, the delivery of data between the various applications may be restricted so that only certain consumers of the data are allowed access to the produced data. There may also be a requirement that, whilst certain data consumer applications can have access to data produced by a data producer application, the data consumer application is not permitted direct access to the data producer application itself and/or even to know that the data producer application is running. This is because the individual applications may be provided by different vendors who do not want a competing vendor to have access to the application itself but may need access to the data the application produces. For example, in an automotive environment a sensor manufacturer may have produced a sensor for use on a car which produces data that is processed by another manufacturer's equipment. In such a case, the other manufacturer's equipment needs access to the data, but the sensor manufacturer may not want the other manufacturer directly probing the configuration of the sensor.

There may also be regulatory restrictions which define how often data can be supplied to a consumer, or how often a consumer can process the data. For example, in a financial institution a process may only be permitted to access live data once every time period, such as once every 10 seconds.

In such environments, there can be a large processing overhead in the selective delivery of data between the data producer applications and data consumer applications. Such overheads can make it expensive and difficult to operate such a system reliably because potentially a large amount of data is required to be sent to a large number of recipients with a high frequency. The reliability of such systems can be critical where the system operates in a control system environment or provides data to applications that provide safety or transactional operations.

There is therefore a need for an improved data processing system that can provide the required level of reliable operation.

BRIEF SUMMARY

According to a first aspect of the present invention there is provided a data management controller for a data processing system, the data processing system being capable of running one or more user space applications, each user space application defining: (i) one or more interface storage locations with which the data management controller can interact, each interface storage location being capable of storing interface data; and (ii) one or more services for processing data, each service interacting with at least one interface storage location during a processing run; the data management controller being configured to: (i) register each of the interface storage locations as an input data location or an output data location in response to the user space application so identifying the respective interface storage location to the data management controller; (ii) register the output data locations of user space applications as designated inputs to input data locations of one or more other user space applications; and (iii) in response to a user space application signalling that a processing run of a service is complete, initiate copying of the interface data stored in the output data locations with which that user space application interacts to the input data locations to which those output data locations are the designated inputs.

The data management controller may be capable of storing a set of transfer rules, each transfer rule may define interaction limitations between one or more interface storage locations; and the data management controller being configured to initiate copying of the interface data in accordance with the set of transfer rules. The interaction limitations may define that an input data location may only have one output data location registered as a designated input. The interaction limitations may define particular input data locations that may only have one output data location registered as a designated input. The interaction limitations may define interface storage locations that may only be accessed in accordance with their associated access data rate.

The one or more services for processing data may be responsive to scheduling instructions from the data management controller to schedule a processing run of the so instructed service. The data management controller may be configured to register the input data locations that are associated with a first service as first service input data locations; and the data management controller may be configured to trigger a processing run of the first service in response to the copying of respective interface data to the first service input data locations.

At least one user space application may define at least one input descriptor, and the data management controller may be configured to register interface storage locations as input data locations on the basis of the input descriptors. At least one user space application may define at least one output descriptor, and the data management controller may be configured to register interface storage locations as output data locations on the basis of the output descriptors. The input descriptor or output descriptor may define interface data location parameters. The input descriptor may define a required input parameter, the required input parameter may identify the output data of another user space application that is the required input to the input data location defined by the input descriptor.

According to a second aspect of the present invention there is provided a data transport controller for a first data processing system, the first data processing system being capable of running one or more user space applications and managing the transfer of data from the application(s) to at least one data consumer, each user space application defining: (i) one or more interface storage locations with which the data transport controller can interact, each interface storage location being capable of storing interface data; and (ii) one or more services for processing data, each service interacting with at least one interface storage location during a processing run; the data transport controller being configured to: (i) register a set of interface storage locations as output data locations; (ii) form a set of transfer rules indicating priority of data demand from the consumers; (iii) select in dependence on the transfer rules a subset of the output data locations for transfer of the stored interface data in a common block to one or more of the consumers; and (iv) copy the selected interface data into a launching storage location in a form suitable for block transfer to a second data processing system supporting one or more of the consumers.

The data transport controller may be configured to form a transfer map indicating positions within the common block which are to be filled with interface data from specific output data locations. The set of transfer rules may rank the output data locations according to the requested access rate of data from the consumers. The data transport controller may be configured to register a set of interface storage locations as output data locations based on an interface location list provided by a data management controller.

According to a third aspect of the present invention there is provided a data management controller for a first data processing system, the first data processing system being capable of running one or more user space applications, each user space application defining: (i) one or more interface storage locations with which the data management controller can interact, each interface storage location being capable of storing interface data; and (ii) one or more services for processing data, each service interacting with at least one interface storage location during a processing run; the data management controller being configured to: (i) register each of the interface storage locations as an input data location or an output data location in response to the user space application so identifying the respective interface storage location to the data management controller; and (ii) receiving, from a second data processing system, an interface location list identifying at least one required input and/or at least one available output; the data management controller further being configured to, if output data locations of the first data processing system correspond to required inputs of the second data processing system, register to send to the second data processing system the interface data contained in those output data locations of the first data processing system; and being configured to, if input data locations of the first data processing system correspond to available outputs of the second data processing system, send a request, to the second data processing system, to be sent the interface data contained in output data locations that correspond to those available outputs of the second data processing system.

The interface location list may identify at least one required input by a required input parameter. The interface location list may identify at least one required output by a required output parameter. Each required input parameter and/or each required output parameter may identify: (i) another user space application, (ii) an output data identifier, and (iii) the second data processing system.

The data management controller may be capable of storing a set of transfer rules, each transfer rule may define interaction limitations between one or more interface storage locations; and the data management controller may be configured to initiate copying of the interface data in accordance with the set of transfer rules. The interaction limitations may define that an input data location may only have one output data location registered as a designated input. The interaction limitations may define particular input data locations that may only have one output data location registered as a designated input. The interaction limitations may define interface storage locations that may only be accessed in accordance with their associated access data rate.

The one or more services for processing data may be responsive to scheduling instructions form the data management controller to schedule a processing run of the so instructed service. The data management controller may be configured to register the input data locations that are associated with a first service as first service input data locations; and the data management controller may be configured to trigger a processing run of the first service in response to the copying of respective interface data to the first service input data locations.

At least one user space application may define at least one input descriptor, and the data management controller may be configured to register interface storage locations as input data locations on the basis of the input descriptors. At least one user space application may define at least one output descriptor, and the data management controller may be configured to register interface storage locations as output data locations on the basis of the output descriptors. The input descriptor or output descriptor may define interface data location parameters. The input descriptor may define a required input parameter, the required input parameter may identify the output data of another user space application that is the required input to the input data location defined by the input descriptor.

BRIEF DESCRIPTION OF THE SEVERAL VIEWS OF THE DRAWING(S)

The present invention will now be described by way of example with reference to the accompanying drawings. In the drawings.

DETAILED DESCRIPTION OF VARIOUS EMBODIMENTS

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a data management controller that is configured to manage the data that is used to interface with the user space applications running on the data processing system 1 and to a data transport controller that is configured to manage the transfer of data from one or more user space applications running on the data processing system to another data processing system that supports one or more consumers of data produced by those user space applications running on the data processing system.

Figure 1:
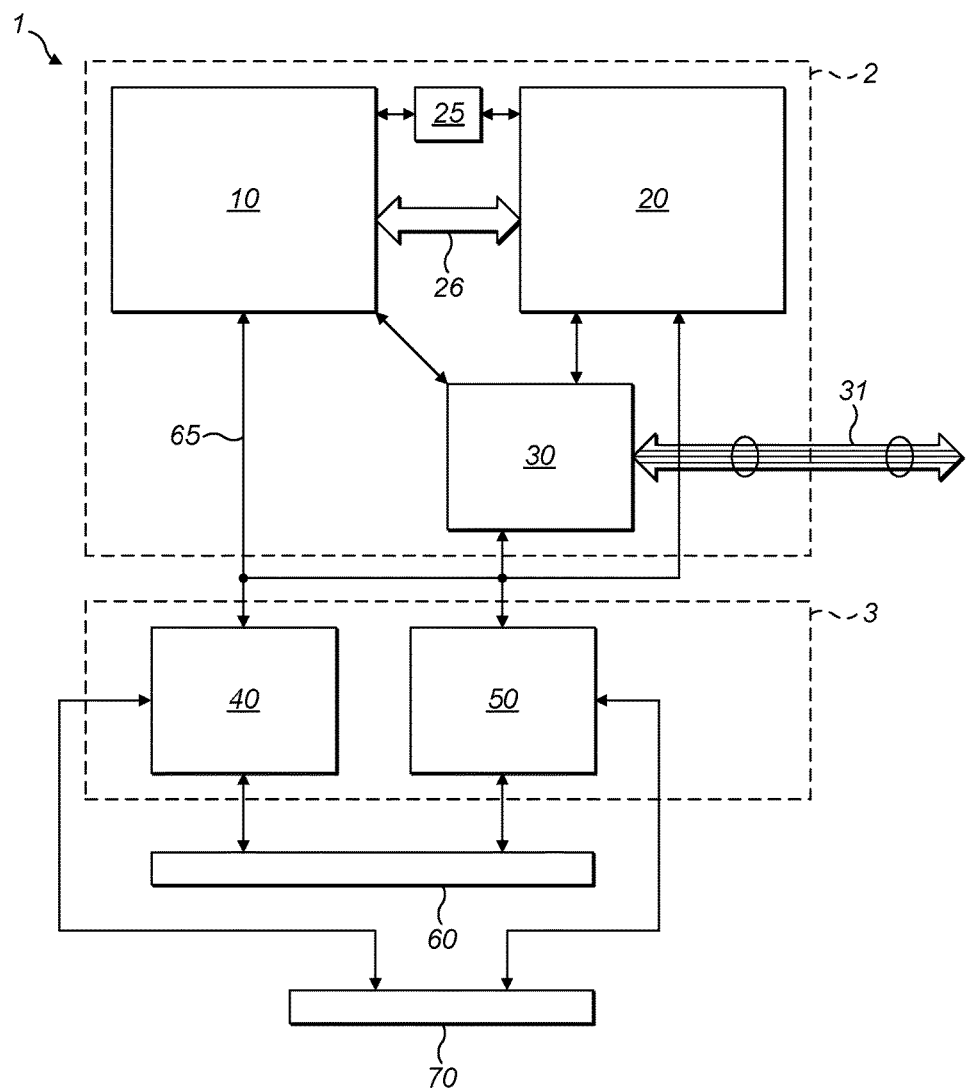
FIG. 1 is a schematic diagram of a data processing system.

FIG. 1 is a schematic diagram of a data processing system 1. The data processing system 1 may be logically divided into an application processing segment 2 and an input and output (I/O) processing segment 3. It should be understood that, although this logical division may be present in the data processing system 1 and will be used in the discussions below, such a logical division may not be present in the physical hardware of the data processing system 1. For example, the data processing system 1 may be implemented on a microprocessor or integrated circuit device with any divisions being defined in the program or configuration of the integrated circuit device.

The data processing system 1 comprises one or more processors 10, 20. These processors may together or separately run an operating system. The operating system is software that can manage hardware and software resources and provides common services for computer programs that run within the operating system. The operating system may define virtual memory which is a mapping technique that maps memory addresses used by a program called virtual addresses into physical addresses in physical memory 25. The physical memory 25 may be comprised of one or more of volatile memory (such as RAM) and non-volatile memory (such as a HDD). The operating system may segregate the memory, and/or virtual memory if defined, into at least kernel space and user space. Generally, kernel space is the memory area reserved for the running of the privileged kernel of the operating system. User space is the memory area where application software may be executed. Such application software can be referred to as user space applications. Each user space application generally runs in its own (virtual) memory space. Each user space application may not be able to access the memory of other user space applications. Such access may be controlled by the operating system and/or the kernel of the operating system.

The one or more processors 10, 20 may be configured to communicate with each other. Such communication may make use of a general bus of the data processing system 1 or may make use of a dedicated bus 26 for inter-processor communication. Such an inter-processor communication bus 26 may be a high speed bus permitting transfer of large amounts of data between the processors in a short period of time. An example of such a bus is Serial RapidIO.

The data processor(s) 10, 20 may be connected to an integrated circuit 30 (IC) that is configured to provide connections 31 that are required by the user space applications running on the data processors. Such connections 31 may be to other devices which can provide inputs or outputs to the user space applications. These other devices may be sensors, measurement devices or control devices such as servos. Alternatively such connections 31 may be made directly by data processors 10, 20.

The data processors 10, 20, memory 25, and IC 30 may form part of the application processing segment 2 of the data processing system.

The data processing system may comprise at least one controller 40, 50 for processing inputs/outputs that are sent over at least one external transport medium 60. The inputs/outputs may originate from user space applications that are being sent to other user space applications that are being run on other data processing systems. The controller(s) 40, 50 may be connected to the processors 10, 20 and the IC 30 by a data transport or physical interconnect, 65. The external transport medium 60 may comprise one or more communication protocols, such as PCIe, RapidIO, DMA Engine, Ethernet, Controller Area Network (CAN) bus. One or more of controllers 40, 50 may also provide inputs/outputs to other devices 70 which can provide inputs or outputs to the user space applications. These other devices may be sensors, measurement devices or control devices such as servo motors.

It should be understood that, although a physical division of data processors 10, 20, IC 30, and controllers 40, 50 have been discussed above, such a physical division may not be present in the physical hardware of the data processing system 1. For example, some or all of the functions that have been described above may be incorporated in to one or more microprocessors or integrated circuit devices.

Figure 2:
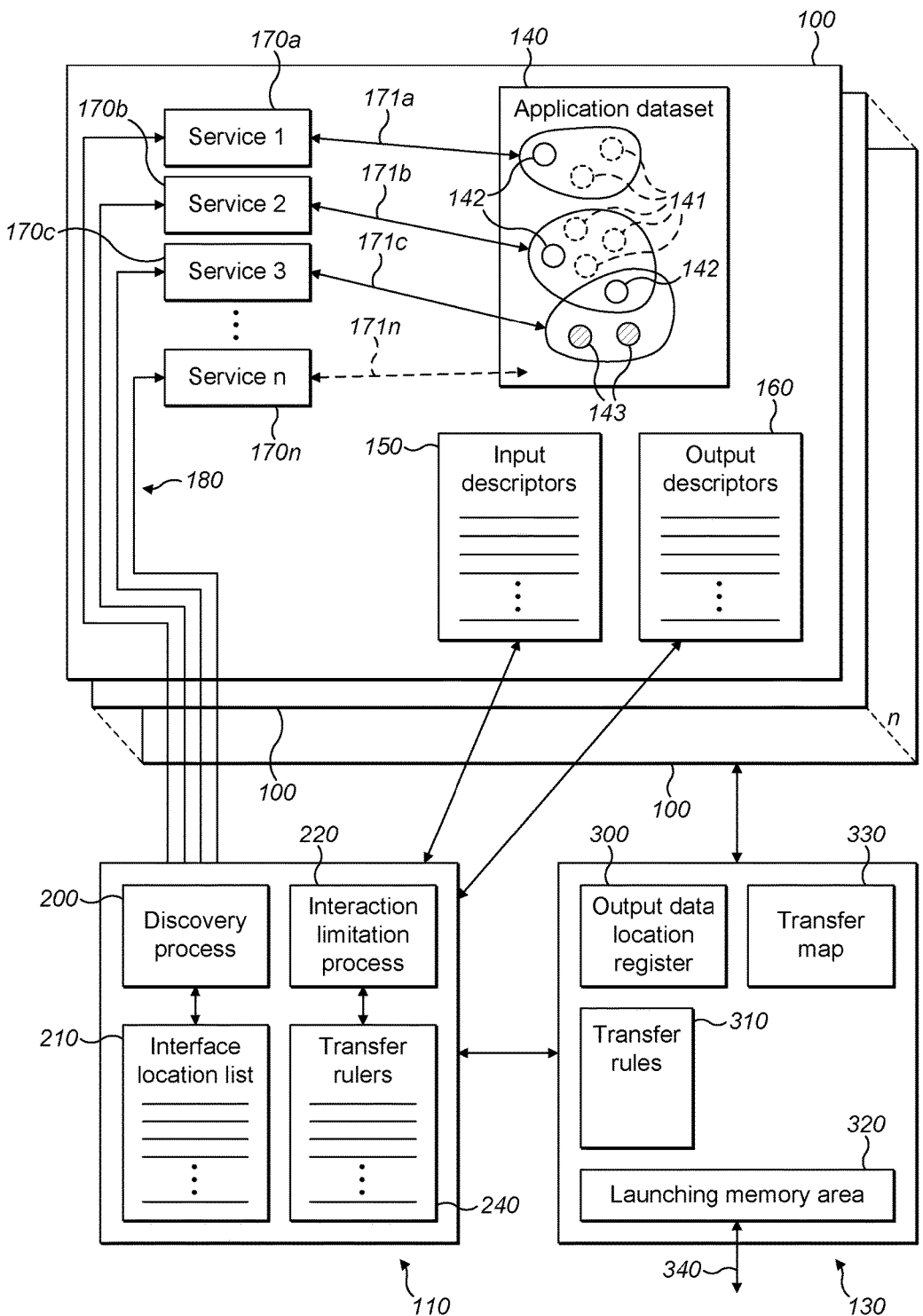
FIG. 2 shows a schematic diagram of the processes that may be run on the data processing system.

FIG. 2 shows a schematic diagram of the processes that may be run on the data processing system 1.

The data processing system 1 is capable of running one or more user space applications 100. The data processing system may comprise a data management controller 110. The data management controller 110 may be configured to manage the data that is used to interface with the user space applications 100 running on the data processing system 1.

The data processing system 1 may comprise a data transport controller 130. The data transport controller 130 may be configured to manage the transfer of data from one or more user space applications 100 running on the data processing system 1 to another data processing system 1 that supports one or more consumers of data produced by those user space applications running on the data processing system 1.

Each user space application 100 may define one or more storage locations for the storage of data associated with that user space application 100. The storage locations for a particular user space application 100 may be located in the user space of that user space application 100. As discussed above, only that particular user space application 100 may be able to access that user space and so those storage locations. The user space applications 100 may not be able to access the user space memory, and so the storage locations, of other user space applications 100. The storage locations form at least part of a user space application dataset 140 associated with that user space application 100. The storage locations may together completely form the user space application dataset 140 associated with that user space application 100.

The storage locations may be designated by the user space application 100 as private storage locations 141. Private storage locations 141 indicate that the data stored in those storage locations is private data. Private data being data that is reserved for use only by that particular user space application 100.

The storage locations may be designated by the user space application 100 as interface storage locations 142, 143. Each interface storage location is capable of storing interface data. Each interface storage location may be designated by the user space application 100 as an input data location 142 or as an output data location 143. An input data location 142 is an interface storage location that may be accessed by the data processing system 1 to provide input data to the user space application. An output data location 143 is an interface storage location that may be accessed by the data processing system 1 to access output data from the user space application 100.

Each user space application 100 may define at least one input descriptor 150. Each input descriptor 150 identifies an interface storage location as an input data location. Each user space application 100 may define at least one output descriptor 160. Each output descriptor 160 identifies an interface storage location as an output data location. Each input and/or output descriptor 150 may define any of the following interface data location parameters:

Unique Identifier of the data location.

Access data rate. E.g. the input data rate or output date rate. The access data rate may be the maximum rate at which data should be accessed in the interface storage location. The access data rate may be the desired rate at which data should be accessed in the interface storage location. In the case that the interface storage location is an output storage location, the access data rate may indicate the rate at which output data is generally updated in the particular output data location. In the case that the interface storage location is an input storage location, the access data rate may indicate the rate at which the user space application expects data to be loaded in to the input storage location. The access data rate may be set to a value that indicates that the interface storage location should not be accessed which may be by indicating that the access data rate is switched off.

Location of the storage location. This may be the physical or virtual memory location for that particular interface storage location within user space application 100.

Size of the storage location. This may describe the total size of that particular interface storage location.

Type of the storage location. This may indicate the data storage type of the storage location. The data storage type may define the physical size of the storage location, for example the maximum length of a value that can be stored in that storage location. The data storage type may also define the content of the data that is stored in the storage location, for example whether it is a number or a string.

Required flag. This may indicate whether the user space application 100, or a particular service 170 of the user space application 100, requires that particular storage location to be filled before the services 170, or that particular service 170, are permitted to be run. The required flag may indicate whether the services 170 of the user space application, or the particular service 170, may be allowed to run if the data stored in that particular storage location is absent.

Another interface data location parameter that is defined by the input descriptor 150 may be the input data required by the user space application to be loaded in to that input data location. The input data required may be defined by a required input parameter for that input data location. The required input parameter may identify (i) another user space application and (ii) an output data identifier describing a particular output data of that other user space application that is required as the input to that input data location. The required input parameter may also identify the data update rate. This may correspond to the access data rate.

The identity of storage locations as private storage locations, interface storage locations, input data locations and output data locations may change over time. Therefore the descriptors in the user space application that so define these locations may alter. For example, the input descriptors and/or the output descriptors may be updated and change the identity of private data locations into interface data locations. Such a change may occur, for example, when the user space application 100 identifies it has more outputs, when another sensor is brought online, or when the user space application 100 is updated.

Each user space application 100 defines one or more services 170 for processing data. Each service 170 is configured to interact 171 with at least one interface storage location 142, 143 during a processing run of the service. The service may interact with an input data location 142 to gather data for processing during a processing run of the service. The service may interact with an output data location 143 to store data that has been processed during a processing run of the service. The service may interact with private data locations 141 to store private data associated with a processing run of the service 170. As shown in FIG. 2, each service may interact with a set of storage locations. The sets of storage locations may overlap as shown with respect to the set of storage locations of service 2 (170*b*) and service 3 (170*c*).

The service 170 can be scheduled, or triggered to run at a particular time. Each service defines one or more program instructions which can process data. The user space applications 100 are responsive to scheduling instructions 180 from the data processing system 1 to schedule a processing run of a particular service 170. The user space applications 100 can also signal to the data processing system 1 that a processing run of the service is complete.

As mentioned above, the data processing system may comprise a data management controller 110. The data management controller 110 may be configured to manage the data that is used to interface with the user space applications 100 running on the data processing system 1.

The data management controller 110 may be configured to run a discovery process 200. The discovery process 200 running as part of the data management controller 110 may be responsive to the input descriptors 150 and/or the output descriptors 160 of the user space applications 100 running on the data processing system 1. The discovery process 200 may periodically request the input and/or output descriptors 150, 160 from the user space applications 100. Alternatively, the user space applications 100 may be configured to register the input and/or output descriptors 150, 160 with the data management controller 110 upon initiation of the user space application 100. The user space application 100 may be configured to register the input and/or output descriptors 150, 160 with the data management controller 110 each time any one of the descriptors 150, 160 is updated.

The data management controller 110 may be configured to register the storage locations as being associated with a particular service 170 running within a user space application 100. For example, the data management controller 110 may be configured to register the input data locations 142 that are associated with a first service 170*a* of a first user space application 100 as first service input data locations.

The data management controller 110 may be configured to register the required input parameter for each input data location that has such a parameter so defined. Such a registration process can happen as part of the registration of the input and/or output descriptors as defined above.

The data management controller 110 may also be configured to receive an interface location list 210 from a second data processing system. The data management controller 110 may receive location lists from more than one other data processing system. The interface location list 210 may identify at least one required input and/or at least one available output of that other data processing system. Each required input and available output may be identified by a required input parameter and an available output parameter respectively. Each required input parameter and available output parameter may identify (i) another user space application, (ii) an output data identifier describing a particular output data of that other user space application that is required as the input to that input data location, (iii) the other data processing system on which the user space application is being run, (iv) the data update rate.

The data management controller 110 may be configured to generate an interface location list 210 as defined above. This interface location list 210 may be sent to other data processing systems. In this way, the available outputs and required inputs may be advertised to the data processing systems that are capable of communicating with each other. Such an advertising process permits each data processing system to identify inputs and outputs of other data processing systems that may be required and supplied respectively by local user space applications.

By virtue of the discovery process, the data management controller stores an interface location list 210 of requested inputs and available outputs for the at least one user space application being run on the data processing system 1. If the data management controller has received interface location lists from other data processing systems then the local interface location list 210 may also store requested inputs and available outputs for user space applications being run on the other data processing systems.

The data management controller is configured to match up the available outputs with the requested inputs and initiate the copying of the interface data stored in the so identified output data locations to the input data locations that have been identified as requiring that output data. Such copying may be done periodically and/or in response to certain triggers as will be discussed below.

This copying process can be undertaken locally within the data processing system 1 where the input data locations and output data locations are both located within the data processing system 1. This copying process can also be undertaken to a remote data processing system where the output data location(s) are located on at least one other data processing systems.

The copying process may not be undertaken by the data management controller 110 itself. The data management controller may initiate the copying of interface data by sending an instruction to the operating system of the data processing system, or alternatively to the kernel of the operating system to copy the interface data from an output data location 143 to an input data location 142. This is because copying of data in and out of a user space application's user memory space may be a restricted operation that requires elevated rights within the data processing system 1. Alternatively, if the data management controller has such elevated rights then it may undertake the copying procedure itself. In the case of interface data being copied to another data processing system, the copying may be managed and undertaken by the data transport controller 130 as discussed below.

In the case of copying process being undertaken locally to the data processing system 1, the user space application(s) identify interface storage locations that are each either input data locations or output data locations. These input data locations and/or output data locations are registered by the data management controller 110 in response to the user space applications so identifying them. The output data locations of user space applications may then be registered as designated inputs to input data locations of one or more other user space applications running on the data processing system. In response to a user space application signalling to the data management controller 110 that a processing run of a service is complete, the data management controller 110 may be configured to initiate the copying of interface data stored in the output data locations with which that user space application interacts to the input data locations to which those output data locations are the designated inputs.

Such a configuration has the advantage that the individual user space applications do not know if the data has been copied out of a particular interface data location. The individual user space applications also do not have any direct access to any other user space application and so cannot interact with those other user space applications to access their status or any other details. The user space applications are merely provided with the output data that they require as an input.

As discussed above, the data management controller 110 may be configured to register the storage locations as being associated with a particular service 170 running within a user space application 100. For example, the data management controller 110 may be configured to register the input data locations 142 that are associated with a first service 170a of a first user space application 100 as first service input data locations. In response to the copying of the respective interface data to the first service input data locations, the data management controller 110 may be configured to trigger a processing run of the first service. The data management controller 110 may be configured to trigger a processing run of the first service in response to all of the first service input data locations being updated.

In the case of the copying process being undertaken to a remote data processing system, the local user space application(s) identify interface storage locations that are each either input data locations or output data locations. These input data locations and/or output data locations are registered by the data management controller 110 in response to the user space applications so identifying them. As discussed above, the data management controller can receive, from a second data processing system, an interface location list 210 identifying at least one required input and/or at least one required output. The local registrations of interface data locations and the interface location list 210 can be processed to match up outputs with inputs. In such a case the data management controller can be configured to, if output data locations of the first data processing system correspond to required inputs of the second data processing system, register to send to the second data processing system the interface data contained in those output data locations of the first data processing system. The data management controller can also be configured to, if input data locations of the first data processing system correspond to available outputs of the second data processing system, send a request, to the second data processing system, to be sent the interface data contained in output data locations that correspond to those available outputs of the second data processing system.

The triggering of services as discussed above may also be undertaken in response to data being copied in to the interface storage locations originating from another data processing system.

The data management controller may also be configured to run an interaction limitation process 220. The data management controller may be capable of storing a set of transfer rules 240 associated with the copying of data between one or more interface storage locations. The transfer rules 240 define interaction limitations between one or more interface storage locations. The interaction limitations may define that:

an input data location 142 may only have one output data location 143 associated with it. This may be limited to particular input data locations 142 or to all input data locations 142 in the data processing system. Such an interaction limitation is designed to stop running with two competing sets of data.

Interface data locations that may only be accessed in accordance with their access data rate. Such an interaction limitation is designed for situations where regulatory requirements dictate how often data can be gathered from particular systems. As described above, the access data rate may indicate that the interface data location should not be accessed.

If transfer rules are so defined, then the data management controller may be configured to initiate copying of the interface data in accordance with the set of transfer rules.

As discussed above, in the case of interface data being copied to another data processing system, the copying may be managed and undertaken by the data transport controller 130. There may be a plurality of interface storage locations which are storing output data that needs to be transferred at a particular frequency to other user space applications running on other data processing systems. Such output data is likely to be distributed throughout the memory, or virtual memory, of the data processing system because each user space application as a separate user space memory defined. Therefore, there needs to be an efficient way of gathering and packaging up the data stored in these output data locations for transfer to the other data processing systems. The output data may be transferred to at least one entity known generally as a data consumer. A data consumer may be another user space application being run on another data processing system.

The data transport controller 130 may maintain an output data location register 300. This output data location register 300 can be used by the data transport controller 130 to store a set of interface storage locations as output data locations 143. The identification of the output data locations 143 may be provided to the data transport controller 130 by the data management controller 110 with which the output locations have been registered by the user space applications 100. The identification of output data locations 143 may be provided to the data transport controller 130 every time there is an update to the interface location list 210 stored by the data transport controller 130.

The data transport controller is configured to form a set of transfer rules 310 which indicate priority of data demand from the data consumers. As discussed above, an access rate may be defined for input data locations. Such an access rate may demand that the requested input data be supplied at a given rate. Thus a particular data demand is defined for each piece of interface data requested by a particular data consumer. As these rates may be different for each particular interface data, a priority can be associated with each of these data demands. This is because the transfer of data out of the data processing system may be data rate limited. Therefore, for any given transfer of data out of the data processing system, a maximum amount of data will be capable of being transferred.

For instance, a data demand of 1 kHz will have a higher priority than a data demand of 1 Hz. If there are multiple 1 Hz data transfers to be undertaken then they can be transferred one after another whilst transferring the 1 kHz data transfer more frequently.

The data transport controller is therefore configured to select in dependence on the transfer rules a subset of the output data locations for transfer of the stored interface data in a common block to one or more of the consumers. The common block permits the potentially disparate pieces of output data to be bundled up for transfer to another data processing system. The data transport controller may form a transfer map 330 indicating which positions within the common block are to be filled with each piece of output data that is to be copied.

Finally, the data transport controller may be configured to copy the selected interface data into a launching storage location 320 in a form suitable for block transfer 340 to a second data processing system supporting one or more of the consumers. Block transfer may be where a, potentially fixed-size, block of data is transferred together to a second data processing system. The use of a block transfer permits efficient transfer of the data to another data processing system. The copying to the launching storage location 320 may be undertaken on the basis of the transfer map 330 defined above.

Generally, any of the methods or techniques described above can be implemented in modules using software, firmware, hardware (e.g. fixed logic circuitry), or any combination of these implementations. In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

The term 'processor' and 'computer' are used herein to refer to any device, or portion thereof, with processing capability such that it can execute instructions, or a dedicated circuit capable of carrying out all or a portion of the functionality or methods, or any combination thereof.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed:

1. A data management controller for a data processing system, the data processing system being configured to run one or more user space applications, each user space application comprising:

one or more interface storage locations with which the data management controller is configured to interact, each interface storage location being configured for storing interface data; and one or more services for processing data, each service interacting with at least one interface storage location during a processing run;

wherein the data management controller is configured to:
register each of the interface storage locations as an input data location or an output data location in response to the user space application so identifying the respective interface storage location to the data management controller;

register the output data locations of user space applications as designated inputs to input data locations of one or more other user space applications; and in response to a user space application signalling that a processing run of a service is complete, initiate copying of the interface data stored in the output data locations with which that user space application interacts to the input data locations to which those output data locations are the designated inputs.

2. The data management controller as claimed in claim 1, the data management controller being configured to store a set of transfer rules, each transfer rule defining interaction limitations between one or more interface storage locations; and the data management controller being configured to initiate copying of the interface data in accordance with the set of transfer rules.

3. The data management controller as claimed in claim 2, wherein the interaction limitations define that an input data location may only have one output data location registered as a designated input.

4. The data management controller as claimed in claim 3, wherein the interaction limitations define particular input data locations that may only have one output data location registered as a designated input.

5. The data management controller as claimed in claim 2, wherein the interaction limitations define interface storage locations that may only be accessed in accordance with their associated access data rate.

6. The data management controller as claimed in claim 1, wherein the one or more services for processing data are responsive to scheduling instructions from the data management controller to schedule a processing run of the so instructed service.

7. The data management controller as claimed in claim 1, the data management controller being configured to register the input data locations that are associated with a first service as first service input data locations; and the data management controller being configured to trigger a processing run of the first service in response to the copying of respective interface data to the first service input data locations.

8. The data management controller as claimed in claim 1, wherein at least one user space application defines at least one input descriptor, and the data management controller is configured to register interface storage locations as input data locations on the basis of the input descriptors.

9. The data management controller as claimed in claim 8, wherein the input descriptor defines interface data location parameters.

10. The data management controller as claimed in claim 1, wherein at least one user space application defines at least one output descriptor, and the data management controller is configured to register interface storage locations as output data locations on the basis of the output descriptors.

11. The data management controller as claimed in claim 10, wherein the output descriptor defines interface data location parameters.

12. The data management controller as claimed in claim 8, wherein the input descriptor defines a required input parameter, the required input parameter identifying the output data of another user space application that is the required input to the input data location defined by the input descriptor.

13. A data management controller for a first data processing system, the first data processing system being configured to run one or more user space applications, each user space application comprising:

one or more interface storage locations with which the data management controller can interact, each interface storage location being configured to store interface data; and one or more services for processing data, each service interacting with at least one interface storage location during a processing run;

wherein the data management controller is configured to:
register each of the interface storage locations as an input data location or an output data location in response to the user space application so identifying the respective interface storage location to the data management controller;

receive, from a second data processing system, an interface location list identifying at least one of: at least one required input or at least one available output;

when output data locations of the first data processing system correspond to required inputs of the second data processing system, register to send to the second data processing system the interface data contained in those output data locations of the first data processing system; and when input data locations of the first data processing system correspond to available outputs of the second data processing system, send a request, to the second data processing system, to be sent the interface data contained in output data locations that correspond to those available outputs of the second data processing system.

14. The data management controller as claimed in claim 13, wherein the interface location list identifies at least one required input by a required input parameter.

15. The data management controller as claimed in claim 13, wherein the interface location list identifies at least one required output by a required output parameter.

16. The data management controller as claimed in claim 14, wherein each required input parameter identifies: (i) another user space application, (ii) an output data identifier, and (iii) the second data processing system.

17. The data management controller as claimed in claim 13, the data management controller being configured for storing a set of transfer rules, each transfer rule defining interaction limitations between one or more interface storage locations; and the data management controller being configured to initiate copying of the interface data in accordance with the set of transfer rules.

18. The data management controller as claimed in claim 17, wherein the interaction limitations define that an input data location may only have one output data location registered as a designated input.

19. The data management controller as claimed in claim 18, wherein the interaction limitations define particular input data locations that may only have one output data location registered as a designated input.

20. The data management controller as claimed in claim 17, wherein the interaction limitations define interface storage locations that may only be accessed in accordance with their associated access data rate.

21. The data management controller as claimed in claim 13, wherein the one or more services for processing data are responsive to scheduling instructions from the data management controller to schedule a processing run of the so instructed service.

22. The data management controller as claimed in claim 13, the data management controller being configured to register the input data locations that are associated with a first service as first service input data locations; and the data management controller being configured to trigger a processing run of the first service in response to the copying of respective interface data to the first service input data locations.

23. The data management controller as claimed in claim 13, wherein at least one user space application defines at least one input descriptor, and the data management controller is configured to register interface storage locations as input data locations on the basis of the input descriptors.

24. The data management controller as claimed in claim 23, wherein the input descriptor defines interface data location parameters.

25. The data management controller as claimed in claim 13, wherein at least one user space application defines at least one output descriptor, and the data management controller is configured to register interface storage locations as output data locations on the basis of the output descriptors.

26. The data management controller as claimed in claim 25, wherein the output descriptor defines interface data location parameters.

27. The data management controller as claimed in claim 23, wherein the input descriptor defines a required input parameter, the required input parameter identifying the output data of another user space application that is the required input to the input data location defined by the input descriptor.

28. The data management controller as claimed in claim 15, wherein each required output parameter identifies: (i) another user space application, (ii) an output data identifier, and (iii) the second data processing system.

* * * * *